R. S. WARING.

UNITING ELECTRIC CABLES.

No. 10,458. Reissued Mar. 11, 1884.

WITNESSES:

R. A. Whittlesey

C. M. Clark

INVENTOR, RICHARD S. WARING.

BY ATTORNEY, George H. Christy

UNITED STATES PATENT OFFICE.

RICHARD S. WARING, OF PITTSBURG, PENNSYLVANIA.

UNITING ELECTRIC CABLES.

SPECIFICATION forming part of Reissued Letters Patent No. 10,458, dated March 11, 1884.

Original No. 268,159, dated November 28, 1882. Application for reissue filed December 28, 1883.

DIVISION A.

*To all whom it may concern:*

Be it known that I, RICHARD S. WARING, a citizen of Pittsburg, county of Allegheny, State of Pennsylvania, have invented or discovered a new and useful Improvement in Uniting Electric Cables; and I do hereby declare the following to be a full, clear, concise, and exact description thereof, reference being had to the accompanying drawings, making part of this specification, in which—like letters indicating like parts—

Figure 1:
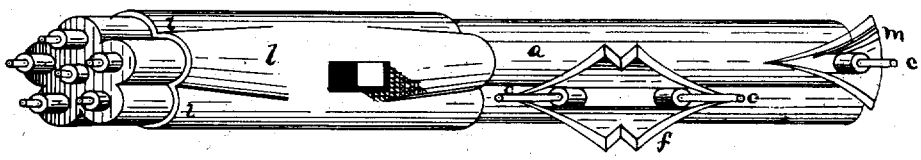
Figure 2:
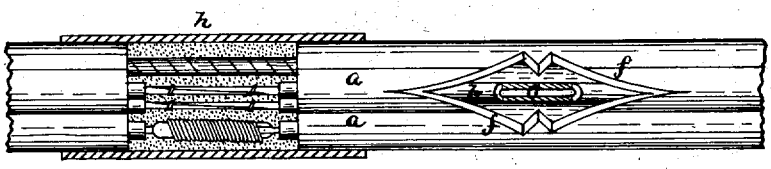
Figure 3:
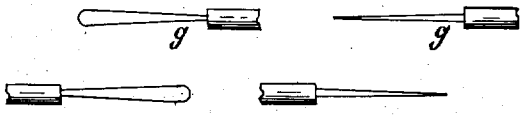

Figure 1 represents an elevation of a section of cable, showing the method of connecting sections of cables and of branching one or more of the conductors at any desired point. Fig. 2 represents a view partly in side elevation and partly in longitudinal section, showing the manner of connecting the wires, and also the initial steps of the method of branching the insulated wires or conductors. Fig. 3 represents views of the flattened wires.

This invention relates to certain improvements in that class of cables for the transmission of electric currents which are composed of insulated wires surrounded by an armor of lead or other ductile material, the said armor being formed with longitudinal ribs, with the insulated wires or conductors extending through them, and which may also be provided with a central or longitudinal insulated wire or group of wires.

The invention consists in the method of uniting the sections of the cable and connecting the wires, all as more fully hereinafter described and claimed.

The cable is constructed of an armor, of lead or other ductile material, provided with a series of longitudinal ribs, *a*, through which extend longitudinally the wires or conductors *c*, surrounded with insulating material *b*. The grooves *k* between the ribs may be of any desired shape or depth, and the armor may be provided with a central longitudinal passage, which may be corrugated or plain, for a group of insulated wires or conductors, or a single heavy wire or conductor sufficiently large to convey the strong currents necessary for electric motors or the production of the electric light or other like purposes. In order to form intermediate branches, the ribs are cut longitudinally and transversely, as shown in Figs. 1 and 2, forming lips *f*, which are bent outward laterally, exposing the wire or conductor, which is denuded of its insulating material, as shown at *e*, Fig. 2. The wire or conductor is then cut, and the ends are bent outward, as shown in Fig. 1, after which the lips are bent back into place and soldered, leaving the wires or conductors projecting at right angles or otherwise, to be united to any desired branch line. In uniting these turned-out ends *c* to the branch conductors, I may flatten the ends *c* and the ends of the branch, as shown in Fig. 3, and then place the flattened ends together, and secure them in that position by wrapping the lapped ends with wire, and cover the whole joint with solder, and finally cover the whole joint with insulating material; or I may unite the ends *c* to the branch line in any suitable manner. A small tube, of lead or other suitable material, may be placed over each branch and soldered to the cable. To connect the wires or conductors of the different sections, the said wires are denuded and flattened at their ends, as indicated in Fig. 2 of the drawings by the letter *g*. To further secure the connection, the matched ends of the wires or conductors are bound with fine copper or other wire, or with fibrous material, and in the latter case a strip of lead is placed upon the wrapping, so as to connect with the armor to carry off the induced current. When thus connected, the armor of the section is united by means of a thin sheet of lead, *h*, which is preferably corrugated to correspond with the corrugations of the sections, the said sheet being bent into the form of a sleeve having its edges lap-jointed, and then soldered to prevent access of moisture inside the joint. An opening, *l*, having a flap, is formed in the side of the sleeve *h*, and after the sections have been connected insulating material is filled in through said opening, embedding the connected ends of the wires, thus insuring thorough insulation. After filling, the flap is closed and soldered, and the union will be complete.

In so far as relates to the method of forming loops or branches in the conductors of lead-armored cable herein shown and described, the same is not herein claimed, but forms the subject-matter of another division of this application.

I claim herein as my invention—

1. The method herein described of connecting two or more sections of a lead-armored cable, which consists in electrically uniting the ends of the conductors, covering them with insulating material, covering the insulated joint and conductors from one section of lead armor to the other with lead, and finally securely connecting the two sections of the armor, substantially as set forth.

2. The method herein described of connecting two or more sections of a lead-armored cable, which consists in electrically uniting the ends of the conductors, covering them with insulating material, wrapping the insulated joint and conductors from one section of the lead armor to the other with lead, securely connecting the two sections of armor by a leaden sleeve, and finally filling the sleeve with insulating material, substantially as set forth.

3. The method herein described of connecting two or more sections of a lead-armored cable, which consists in first flattening the ends of the wires to a tapering form, then lapping and soldering them, then wrapping them with wire, then insulating them and inclosing the insulated joint of each wire with a wrapping of thin lead extending from one section of the lead armor to the other, then placing an outer leaden sleeve over the ends of the two cable-sections and soldering the same, and finally filling the space within the joint with insulating material, substantially as described.

In witness whereof I have hereunto set my hand.

RICHARD S. WARING.

Witnesses:
WM. A. SHAW,
JOS. W. MARSH.